United States Patent Office.

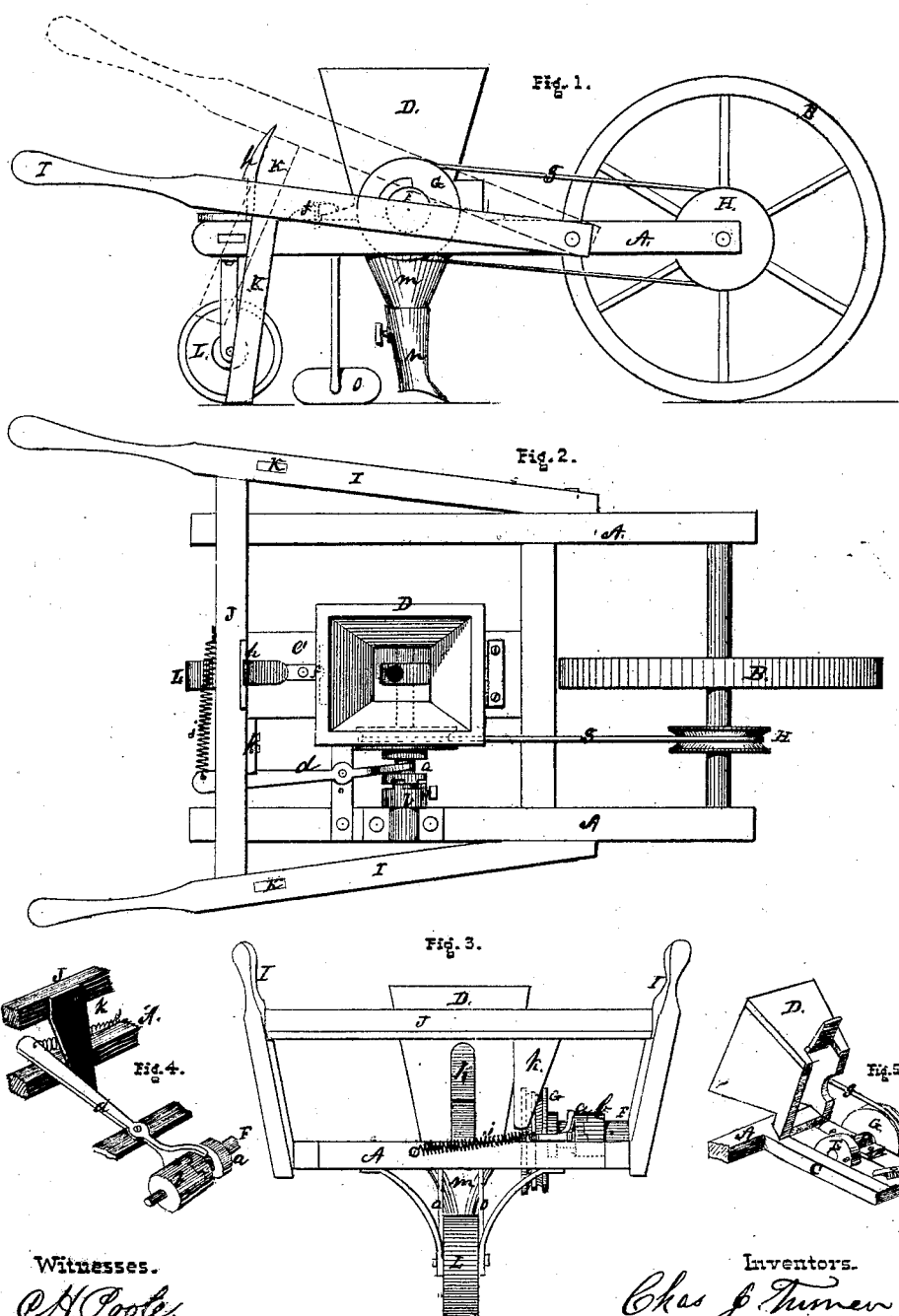

CHARLES J. TURNER AND MARCELLOUS L. WILKINSON, OF OLEAN, NEW YORK.

Letters Patent No. 114,066, dated April 25, 1871.

IMPROVEMENT IN SEED-PLANTERS.

The Schedule referred to in these Letters Patent and making part of the same.

*To all whom it may concern:*

Be it known that we, CHARLES J. TURNER and MARCELLOUS L. WILKINSON, of Olean, in the county of Cattaraugus and State of New York, have invented certain new and useful Improvements in a Hand-Barrow Seed-Planter, for Planting either in Rows or Hills; and the following is a full, clear, and exact description of the same, reference being had to the accompanying drawing making a part of this specification, in which—

Figure 1 represents a side-view elevation of the whole implement.

Figure 2 shows a plan or top view of the same.

Figure 3 shows a rear end view of the same.

Figure 4 is a detached view of the clutch mechanism, showing the means and mode of operating it.

Figure 5 is a detached view of the distributing mechanism, with the hinged hopper raised up, showing a distributing-cylinder on a shaft, and the band-pulley for operating it.

Our invention relates to a very necessary class of agricultural implements, and one on which numerous improvements have been made and many patents granted both in this and foreign countries.

Our invention consists in the arrangement of the clutch mechanism for operating the distributing and dropping-cylinders, in combination with the movable barrow-handles by which it is held in or thrown out of gear; also in the hinged-hopper, to allow it to be raised, for the convenience of changing the distributing-cylinders for drilling in rows or planting in hills the various sizes and kinds of seeds, so that its adaptation will be universal for all purposes of garden and field planting.

To enable others to make or use our improved hand-barrow seed-planter, we will describe it more in detail, referring to the drawing and the letters marked thereon.

The frame A, to which the barrow or driving-wheel B and the planting mechanism is attached, may be made of hard wood of any desired size and shape.

In the rear, and in the line of the driving-wheel B, is framed in, or otherwise secured, longitudinal timbers or a plank, C, of suitable and sufficient width, on which the hopper D is hinged in front, so that it may be lifted up clear from the cylinder E to allow it to be easily removed from the shaft F and another put on, suitable for the kind of seed to be planted.

The distributing-cylinders E have in their periphery a series of holes, *e e*, of such various sizes and at such distances apart as is necessary for planting or drilling in the various kinds of seeds.

The distributing-cylinder E is driven by a clutch-pulley, G, and band *g*, connecting with a corresponding pulley, H, on the shaft of the barrow-wheel B.

The clutch *a* is grooved in the usual manner to be operated by a forked lever, *d*, by which it is thrown out or into a corresponding matrix, *b*, secured to the shaft F by a key or set-screw.

To the frame A is secured, on the outside of both sides, the handles I I, which are connected together by a cross-bar, J, and are provided with legs or standards K K of such length as to correspond with the rear or pressing-roller L, which is secured on the under side of the rear end of the frame A and holds the implement in an upright position when at rest, the handles I I being held in position on the frame A by a hook-catch, *h*, on the bar J, to which is secured a vertical inclined edge-plate, *k*, which acts on the forked lever *d* and unlocks the clutch *a* and holds it out of gear, so that the cylinder E will not revolve to discharge the seed until the handles are lifted off the rear end of the frame A, when the clutch is instantly thrown into gear by the action of the spring *j* at the rear end of the lever *d*.

The hopper D is held down firmly on the plank C by the button *f*, and is provided directly underneath with a chute, *m*, and a detachable point, *n*, for opening the soil and leaving the seed centrally in the trench, to be instantly covered up by the two inclined scrapers *o o*, placed between the point *n* and the presser-roller L.

Any number and variety of the liberating-rollers can be used, and be made so as to be adapted to planting all the variety of seeds, and the best mode of depositing them in the soil.

What we claim as our invention is—

1. The clutch mechanism as arranged for operating the dropping-cylinder E, the lever *d*, and incline *k*, in combination with the movable barrow-handles I I, by which the clutch is thrown and held out of gear, substantially as shown and described.

2. The movable handles I I as connected together, with their supports K K, as arranged, when combined with a hand-barrow seed-planter, for operating in the manner substantially as and for the purposes herein set forth.

In testimony whereof we severally and jointly subscribe our names in the presence of—

CHARLES J. TURNER.
MARCELLOUS L. WILKINSON.

Witnesses:
J. F. JOHNSON,
GEO. SLOAT.